(12) United States Patent
Cady

(10) Patent No.: US 11,271,843 B1
(45) Date of Patent: Mar. 8, 2022

(54) QUALITY OF SERVICE PERFORMANCE DIAGNOSTIC MECHANISM

(71) Applicant: NetApp, Inc., Sunnyvale, CA (US)

(72) Inventor: Tyler Cady, Denver, CO (US)

(73) Assignee: NetApp, Inc., San Jose, CA (US)

(*) Notice: Subject to any disclaimer, the term of this patent is extended or adjusted under 35 U.S.C. 154(b) by 0 days.

(21) Appl. No.: 17/234,963

(22) Filed: Apr. 20, 2021

(51) Int. Cl.
*H04L 12/26* (2006.01)
*H04L 29/08* (2006.01)
*H04L 43/50* (2022.01)
*H04L 67/1097* (2022.01)

(52) U.S. Cl.
CPC .......... *H04L 43/50* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 10,474,723 B2* | 11/2019 | Hodge | G06F 16/904 |
| 2002/0083187 A1* | 6/2002 | Sim | H04L 67/1019 |
| | | | 709/235 |
| 2014/0098671 A1* | 4/2014 | Raleigh | G06Q 20/40 |
| | | | 370/235 |
| 2018/0129503 A1* | 5/2018 | Narayan | H03K 19/0175 |
| 2018/0276253 A1* | 9/2018 | Ellis, Sr. | G06F 16/21 |
| 2019/0205745 A1* | 7/2019 | Sridharan | G06F 9/5077 |
| 2019/0349426 A1* | 11/2019 | Smith | H04L 67/104 |
| 2020/0162353 A1* | 5/2020 | Szigeti | G06T 11/206 |

* cited by examiner

*Primary Examiner* — Davoud A Zand
(74) *Attorney, Agent, or Firm* — Jaffery Watson Mendonsa & Hamilton LLP

(57) ABSTRACT

A system is described. The system includes a processing resource and a non-transitory computer-readable medium, coupled to the processing resource, having stored therein instructions that when executed by the processing resource cause the processing resource to collect quality of service (QoS) data of a distributed storage system associated with a client device, generate a plurality of QoS diagnostic views to facilitate display of visual representations of the collected QoS data and transmit the visual representations for display at the client device, wherein the data comprises telemetry data, statistics and performance health scores for nodes associated with the client device.

20 Claims, 9 Drawing Sheets

QUALITY OF SERVICE PERFORMANCE DIAGNOSTIC MECHANISM

BACKGROUND

In data storage architectures, a client's data may be stored in a volume. The client can access the client data from the volume via one or more volume servers coupled to the volume. The volume servers can map the locations of the data specified by the client, such as file name, drive name, etc., into unique identifiers that are specific to the location of the client's data on the volume. Using the volume server as an interface to the volume allows the freedom to distribute the data evenly over the one or more volumes. The even distribution of data can be beneficial in terms of volume and system performance.

Read and write requests of the client are typically transformed into read and/or write input-output operations (LOPS). For example, a file read request by a client can be transformed into one or more read IOPS of some size. Similarly, a file write request by the client can be transformed into one or more write IOPS.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
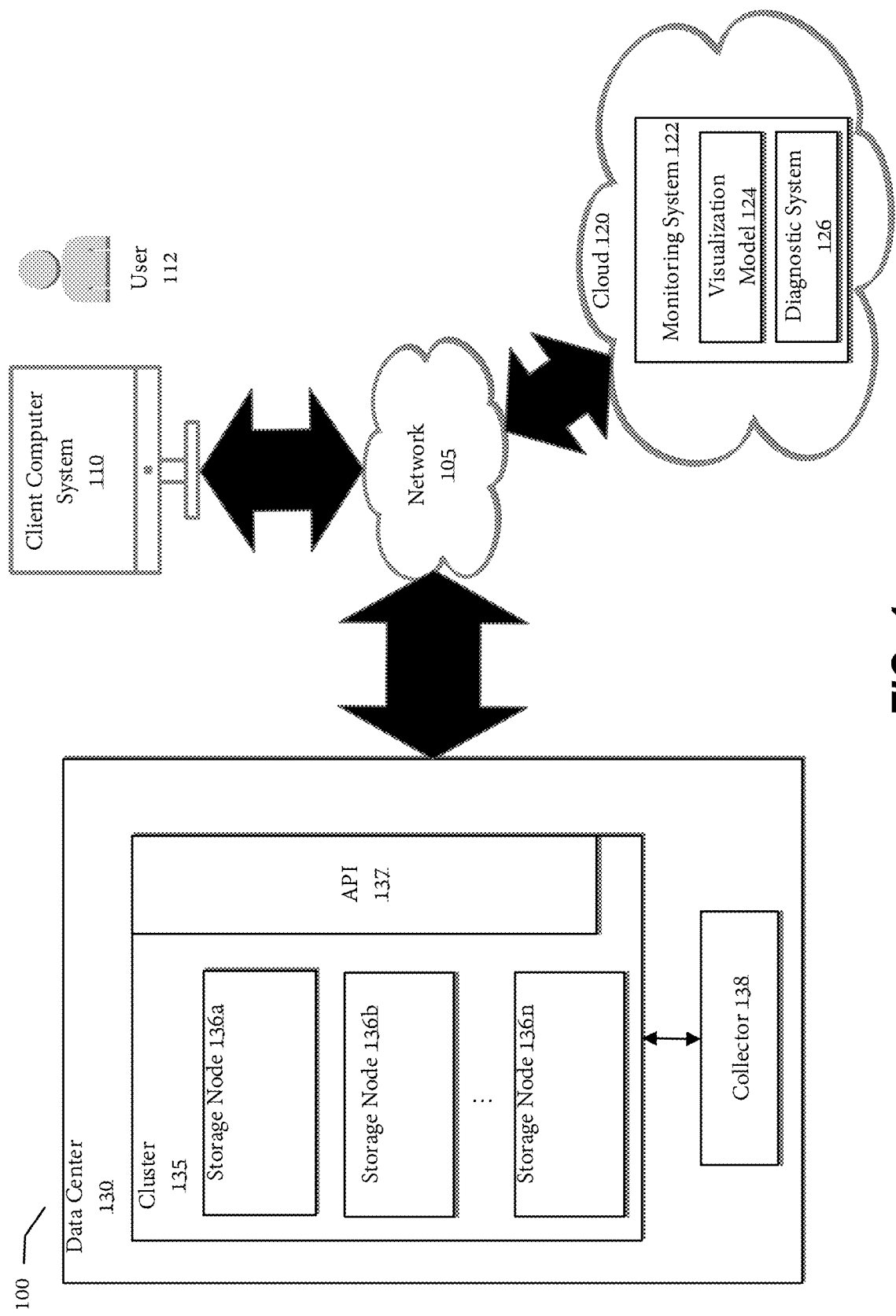
FIG. 1 is a block diagram illustrating an environment in which various embodiments may be implemented.

IOPS is a standard way of measuring the performance of a storage system by providing an indication as to a quantity of requests (e.g., read and write request operations) that are made per second. To estimate IOPS required by a workload on a volume, storage administrators measure the IOPS over a time interval and selects the highest value measured during the time interval. A storage system experiences a sluggish performance in instances in which insufficient IOPS are provided to a workload. Conversely, the storage system will have unused capacity if the provisioned IOPS are higher than what the workload actually needs.

Storage Quality of Service (QoS) policies define the IOPS associated with a volume and ensures that they are met. Thus, QoS parameters are variables that define desired QoS bounds for a client using the storage system. QoS policies also provide consistent performance to workloads, and are using the following parameters: Min-IOPS; Max-IOPS; and Burst-IOPS. Min-IOPS is defined as a minimum quantity of IOPS that will be provided by a policy (e.g., QoS reservation). Max-IOPS is defined as a maximum quantity IOPS that will be limited by a policy (e.g., QoS limit). Burst-IOPS is defined as a quantity of IOPS available for a temporary period based on unused IOPS (e.g., burst credit).

A problem with current QoS policies is that provisioning IOPS to volumes (e.g., across many volumes or slice services) is highly dynamic and complex. Particularly, the level of complexity is difficult to understand for customers and internal stakeholders, which results in a consistent misconfiguration of QoS settings (e.g., via over or under provisioning IOPS minimum, maximum, or burst settings). In many cases such misconfiguration leads to suboptimal QoS utilization, and degrades volume and overall slice service performance More specifically, a cluster having a number (X) of volumes that have disproportionately allocated minimum IOPS settings compared to other volumes in the cluster may lead to load balancing issues in circumstances in which the allocation does not accurately reflect the desired performance.

According to one embodiment, a QoS diagnostic mechanism generates multi-level seamless views into how performance is impacted by QoS settings on the cluster, node, and volume levels, and enables a user to appropriately diagnose and address QoS related performance issues. As used herein, a storage workload is defined as any operation (e.g., data replication, deduplication, data compression etc.) that requires I/O data. Telemetry data may be defined as performance, configuration and other system data of a monitored system. Telemetry data may refer to one data point or a range of data points. Non-limiting examples of telemetry data for a distributed storage system include latency, utilization, a number of IOPS, Quality of Service (QoS) settings, or any other performance related information.

Throughput may be defined as a rate of successful message delivery over a communication channel, and is usually measured in bits per second (bit/s or bps). However in other embodiments, throughput may be measured in data packets per second (p/s or pps) or data packets per time slot. Latency (or delay) is a measure (e.g., in milliseconds (ms)) of an elapsed time between a sending node sending a packet and a receiving node receiving that packet.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

FIG. 1 is a block diagram illustrating an environment 100 in which various embodiments may be implemented. In various examples described herein, an administrator (e.g., user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on a client computer system (or client) 110. In one embodiment, the administrator and/or automated means may use various statistics, analytics and/or visual representations of the gathered data as feedback to improve the functioning of the monitored systems by, for example, tuning various configuration parameters of the managed distributed storage systems and/or delivering storage operating system patches, version upgrades, or the like to the managed distributed storage systems.

In the context of the present example, the environment 100 includes a data center 130, a cloud 120, a client computer system 110, and a user 112. The data center 130, the cloud 120, and the client computer system 110 are coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is built, owned, and operated by a company or the data center 130 may be managed by a third party (or a managed service provider) on behalf of the company, which may lease the equipment and infrastructure. Alternatively, the data center 130 may represent a colocation data center in which a company rents space of a facility owned by others and located off the company premises. The data center 130 is shown including a distributed storage system (e.g., cluster 135) and a collector 138. Those of ordinary skill in the art will appreciate additional IT infrastructure would typically be part of the data center 130; however, discussion of such additional IT infrastructure is unnecessary to the understanding of the various embodiments described herein.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to hard disk drives, solid state drives, flash memory systems, or other storage devices. A non-limiting example of a storage node 136 is described in further detail below with reference to FIG. 2.

The API 137 may provide an interface through which the cluster 135 is configured and/or queried by external actors (e.g., the collector 138, the client computer system 110, and a cloud-based, centralized monitoring system (e.g., monitoring system 122). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, a first API call (e.g., GetNodeStats) may be used to obtain information regarding a custom, proprietary, or standardized measure of the overall load (e.g., SS load) or overall performance (e.g., IOPS) of a particular storage node 136 or a second API call (e.g., ListNodeStats) may be used to obtain information regarding the overall load or performance of multiple storage nodes 136. As those skilled in the art will appreciate various other types of telemetry data may be made available via the API 137, including, but not limited to measures of latency, utilization, and/or performance at various levels (e.g., the cluster level, the storage node level, or the storage node component level).

In various examples described herein, the collector 138 is implemented locally within the same data center in which the cluster 135 resides and periodically polls for telemetry data of the cluster 135 via the API 137. Depending upon the particular implementation, the polling may be performed at a predetermined or configurable interval (e.g., X milliseconds or Y seconds). The collector 138 may locally process and/or aggregate the collected telemetry data over a period of time by data point values and/or by ranges of data point values and provide frequency information regarding the aggregated telemetry data retrieved from the cluster 135 to the centralized monitoring system.

In the context of the present example, the cloud 120, which may represent a private or public cloud accessible (e.g., via a web portal) to an administrator associated with a managed service provide and/or administrators of one or more customers of the managed service provider, includes a cloud-based, centralized monitoring system (e.g., monitoring system 122). The monitoring system 122 may periodically receive monitored information, including raw and/or processed telemetry data (e.g., frequency distributions representing aggregated telemetry data over time) of multiple clusters (e.g., cluster 135) from multiple distributed collectors (e.g., collector 138) operable within respective data centers (e.g., data center 130) of one or more customers of the managed service provider. Depending upon the particular implementation, the monitored information may be pushed from the collector 138 or pulled from the collector 138 in accordance with a monitoring schedule or responsive to an event (e.g., a request issued by user 112 to the monitoring system 122).

As noted above, the monitored information may represent hundreds of thousands of observations (samples) of telemetry data over a period of time in which the vast majority of telemetry data may represent normal operating conditions, but a small number of occurrences (e.g., telemetry data exceeding certain thresholds) may be indicative of events of significance (e.g., an abnormal condition, imminent need for increased storage capacity, imminent failure of a storage node 136, or the like).

In one embodiment, the monitoring system 122 includes a visualization model 124 to facilitate visualization of the monitored information. Depending upon the particular implementation, some aspects of the visualization model (e.g., determination and/or configuration of tuning parameters) may be performed and/or applied by the monitoring system 122 and other aspects of the visualization model may be performed and/or applied by the client computer system 110, for example, by a web browser running on the client computer system 110 performing dynamic code execution of code (e.g., JavaScript) delivered to the browser and embedded within a web page (e.g., a Hypertext Markup Language (HTML) file) by or on behalf of the monitoring system 122.

While for sake of brevity, only a single data center and a single cluster are shown in the context of the present example, it is to be appreciated that multiple clusters owned by or leased by the same or different companies may be monitored in accordance with the methodologies described herein and such clusters may reside in multiple data centers of different types (e.g., enterprise data centers, managed services data centers, or colocation data centers).

Figure 2:
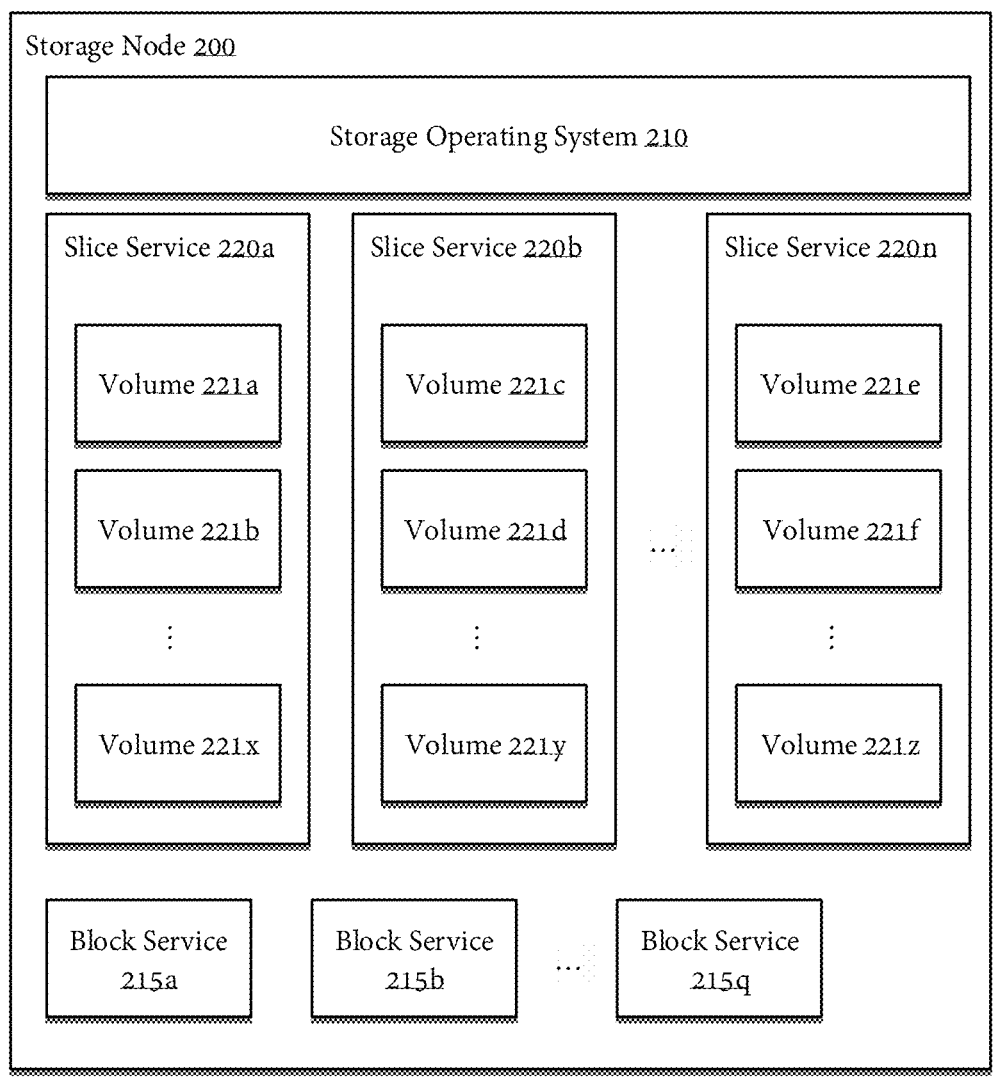
FIG. 2 is a block diagram illustrating a storage node in accordance with an embodiment of the present disclosure.

FIG. 2 is a block diagram illustrating a storage node 200 in accordance with an embodiment of the present disclosure. Storage node 200 represents a non-limiting example of storage nodes 136a-n. In the context of the present example, storage node 200 includes a storage operating system 210, one or more slice services 220a-n, and one or more block services 215a-q. The storage operating system (OS) 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes.

Each slice service 220 may include one or more volumes (e.g., volumes 221a-x, volumes 221c-y, and volumes 221e-z). Client systems (not shown) associated with an enterprise may store data to one or more volumes, retrieve data from one or more volumes, and/or modify data stored on one or more volumes.

The slice services 220a-n and/or the client system may break data into data blocks. Block services 215a-q and slice services 220a-n may maintain mappings between an address of the client system and the eventual physical location of the data block in respective storage media of the storage node 200. In one embodiment, volumes 221 include unique and uniformly random identifiers to facilitate even distribution of a volume's data throughout a cluster (e.g., cluster 135). The slice services 220a-n may store metadata that maps between client systems and block services 215. For example, slice services 220 may map between the client addressing used by the client systems (e.g., file names, object names, block numbers, etc. such as Logical Block Addresses (LBAs)) and block layer addressing (e.g., block identifiers) used in block services 215. Further, block services 215 may map between the block layer addressing (e.g., block identifiers) and the physical location of the data block on one or more storage devices. The blocks may be organized within bins maintained by the block services 215 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 215a-q and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220 and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

As noted above, in some embodiments, a collector module (e.g., collector 138) may poll an API (e.g., API 137) of a distributed storage system (e.g., cluster 135) of which the storage node 200 is a part to obtain various telemetry data of the distributed storage system. The telemetry data may represent performance metrics, configuration and other system data associated with various levels or layers of the cluster or the storage node 200. For example, metrics may be available for individual or groups of storage nodes (e.g., 136a-n), individual or groups of volumes 221, individual or groups of slice services 220, and/or individual or groups of block services 215.

According to one embodiment, monitoring system 122 also includes a diagnostic system 126 that is implemented to generate a plurality of QoS diagnostic views to facilitate the display of visual representations of collected data (e.g., real time and historical data) associated with nodes associated with a client 110. In such an embodiment, multi-level QoS diagnostic views are generated to provide an indication to a user as to how performance is impacted by QoS settings on the cluster, node, and volume level. As a result, QoS related performance issues may be diagnosed and addressed by a user at client 110. In a further embodiment, diagnostic system 126 flows from a high-level cluster view that provides a performance health score for each cluster that is associated with (or owned by) a client 110. Thus, the cluster view provides a quick view of how a customer's clusters are performing.

In one embodiment, a user may select a cluster from the high-level cluster view. Upon selecting a specific cluster, a user is navigated to a node level view that provides node-by-node performance health scores, relevant node level telemetry data, statistics (e.g., SSLoad, and latency correlation between nodes), performance recommendations, and trending. From the node level view, the user may select any node in order to view a finer grained volume level view, which provides a volume-by volume view with volume level telemetry data, statistics (e.g., time with zero and non-zero burst IOPS credits), performance recommendations, and trending. Finally, a user may select a volume to view QoS settings for the volume.

Figure 3:
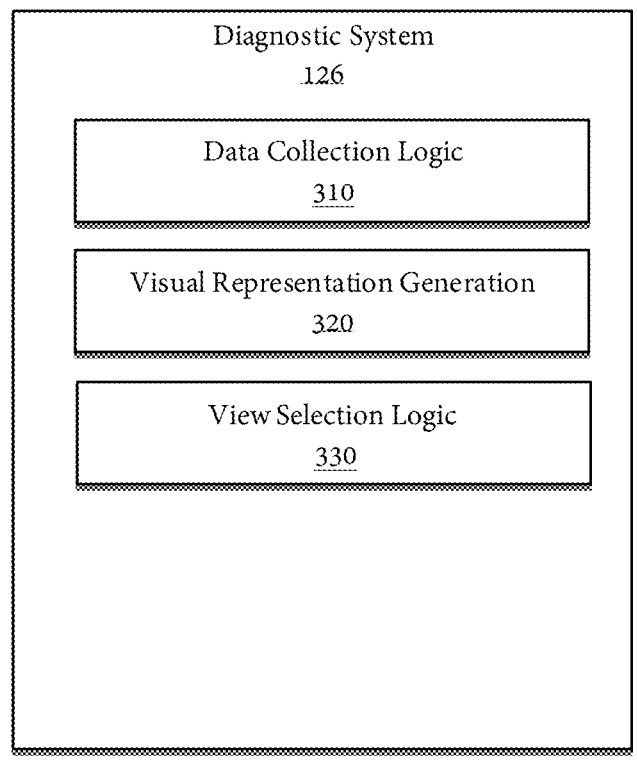
FIG. 3 illustrates one embodiment of a diagnostic system.

FIG. 3 illustrates one embodiment of diagnostic system 126. As shown in FIG. 3, diagnostic system 126 includes data collection logic 310, visual representation generation logic 320 and view selection logic 330. Data collection logic 310 collects node telemetry data, statistics and performance health scores for nodes associated with a client 110. The received data is used by visual representation generation logic 320 to generate a plurality of visual representations that are transmitted for display at client 110. As discussed above, the visual representations may include a cluster level view, a node level view and a volume view. In a further embodiment, an in-depth volume level view is provided upon selection of a volume in the volume view. View selection logic 330 enables a client 110 to select from among the various views provided by diagnostic system 126.

Figure 4A:
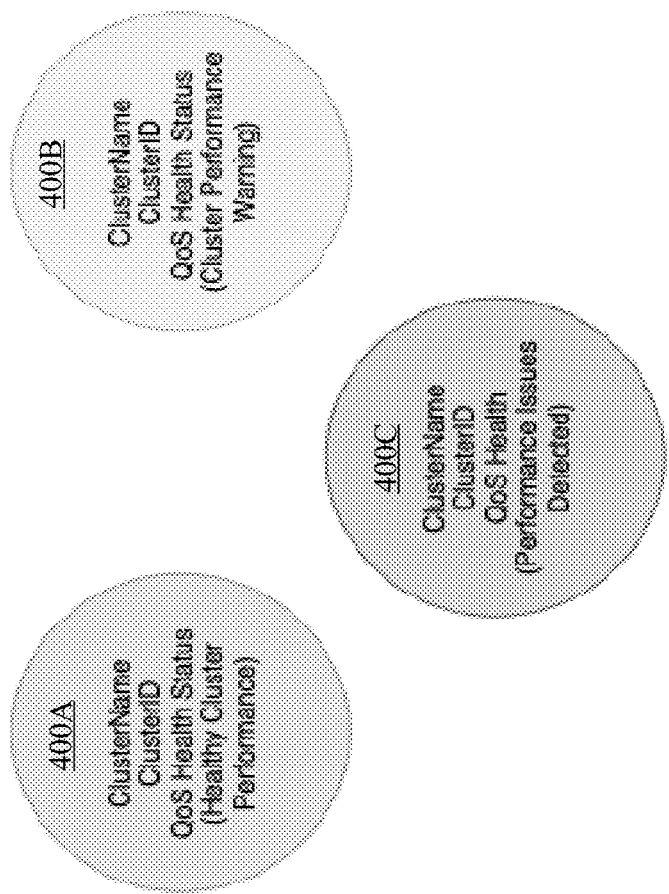
FIGS. 4A-4D illustrate embodiments of visual representations that can be generated by components of a diagnostic system.

FIGS. 4A-4D illustrate embodiments of the various visual representations that can be generated by visual representation generation logic 320. FIG. 4A illustrates one embodiment of a top-level cluster view including clusters 400 (e.g., 400A-400C). As shown in FIG. 4A, each cluster includes a cluster name, cluster identifier (ID) and QoS health status (e.g., healthy cluster performance, cluster performance warning or performance issues detected) associated with the cluster. In one embodiment, each cluster 400 may include a color coding to provide a visual indication of the health status. For example, cluster 400A may have a green color to indicate that the cluster has healthy cluster performance, while clusters 400B and 400C have a yellow color and red color to indicate the clusters have a cluster performance warning and performance issues detected, respectively.

Figure 4B:
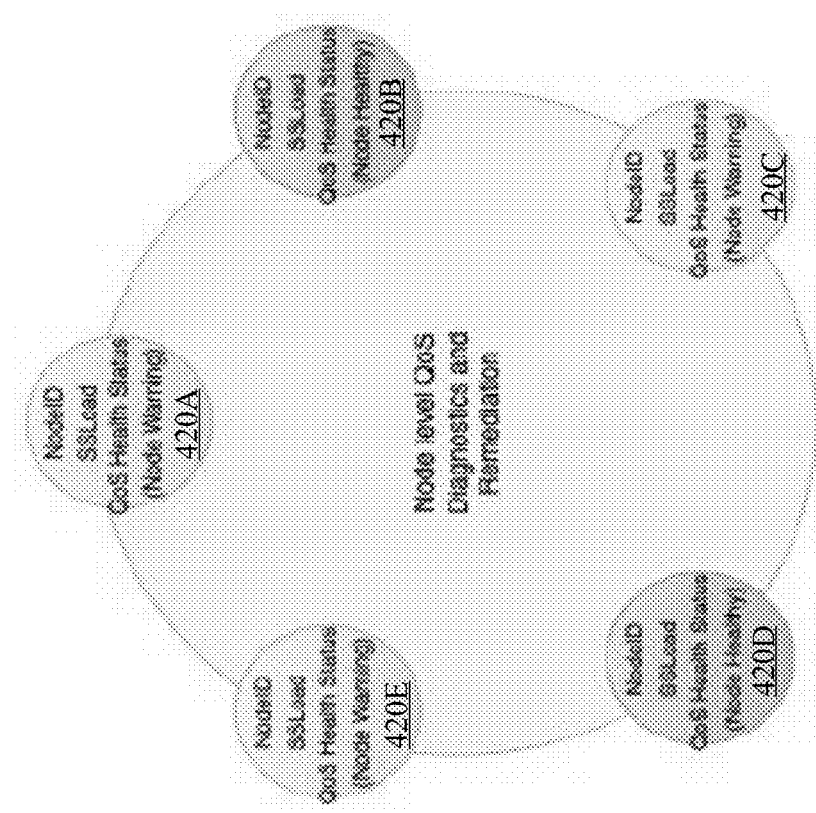

In one embodiment, a user at client 110 may select a cluster 400 to view a node level view, which provides for node level QoS diagnostics and remediation of nodes included in a cluster 400 selected from the cluster view. FIG. 4B illustrates one embodiment of a node-level view including nodes 420 (e.g., 420A-420E). As shown in FIG. 4B, each node 420 includes a node ID, Slice Service Load (SSLoad) and QoS health status (e.g., node healthy or node warning). In one embodiment, SSLoad represents a maximum value between a primary cache (PCache) and a secondary cache (SCache) capacity utilization as measured in in bytes (e.g., a percentage fullness of 8 GB in PCache and "lots" of GB in SCache). In one embodiment, SSLoad is measured across slice services hosting a given volume, such that:

SsLoad=max(pcache, scache) across all services hosting the given volume.

Nodes 420 may also include color coding to provide a visual indication of the health status. For example, nodes 420A, 420C and 420E include a yellow color to indicate that the node status is a node warning, while nodes 420B and 400D have a green color to indicate that they are healthy nodes.

Figure 4C:
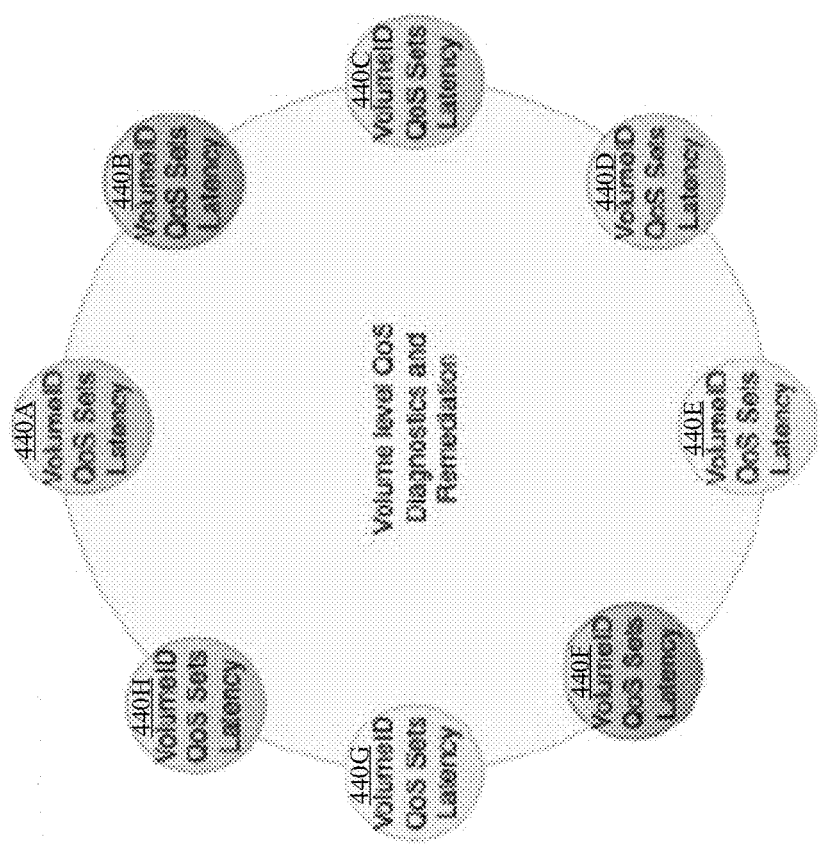

In one embodiment, a user at client 110 may select a node 420 to view a volume level view, which provides volume level QoS diagnostics and remediation. FIG. 4C illustrates one embodiment of a volume level view including volumes 440 (e.g., 440A-420H). As shown in FIG. 4C, each volume 440 includes a volume ID and QoS sets latency. Each volume 440 may also include a color coding to provide a visual indication of the QoS sets latency. For example, volumes 440A, 440C, 440D and 440H may have a green color to indicate that the volumes have a healthy cluster latency; while volumes 440E and 440G have a yellow color to indicate a warning; and volumes 440B and 440F have a red color to indicate a detected issue.

Figure 4D:
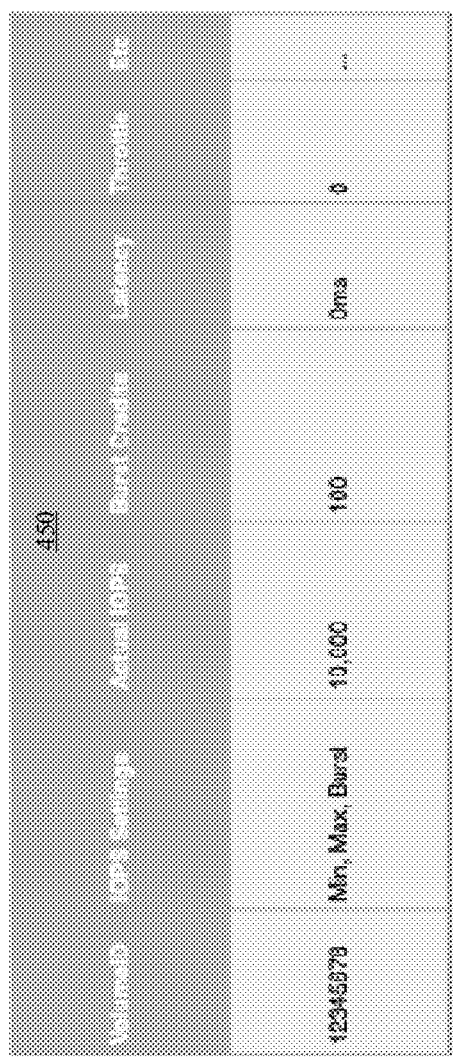

In a further embodiment, a volume may be selected to provide an in-depth volume level view. FIG. 4D illustrates one embodiment of an in-depth volume level view. As shown in FIG. 4D, a table 450 shows various QoS parameters (e.g., Min, Max, Burst, Actual IOPS, Burst Credits, etc.) associated with the selected volume.

Figure 5:
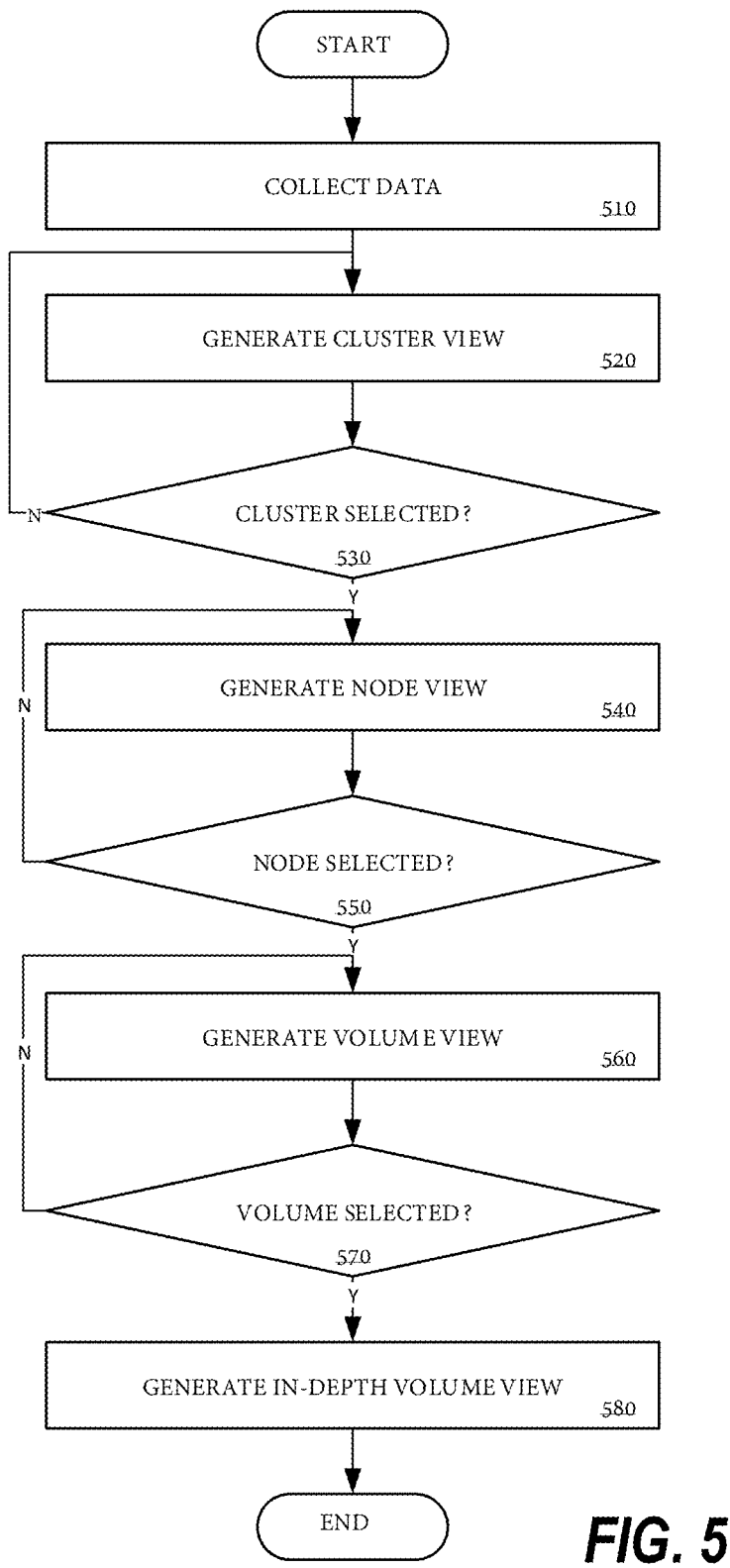
FIG. 5 is a flow diagram illustrating one embodiment of a performance diagnostics process.

FIG. 5 is a flow diagram illustrating one embodiment of a performance diagnostics process. At processing block 510, data (e.g., telemetry data, statistics and performance health scores) for nodes associated with a client 110 is collected. At processing block 520, the collected data is used to generate a top-level cluster view for display. As discussed above, the cluster view includes a plurality of clusters, each comprising a cluster name, cluster ID and QoS health status. At decision block 530, a determination is made as to whether a user at a client 110 has selected a cluster for further examination. If not, control is returned to processing block 520, where the cluster view continues to be displayed at client 110.

Upon a determination at decision block 530 that a cluster in the top-level cluster view has been selected a node level view is generated, processing block 540. As discussed above, the node level view includes a plurality of nodes in the selected cluster, each including a node ID, SSLoad and QoS health status. At decision block 550, a determination is made as to whether a user at a client 110 has selected a node for further examination. If not, control is returned to processing block 540, where the node view continues to be displayed at client 110.

Upon a determination at decision block 550 that a node in the node level view has been selected, a volume view is generated, processing block 560. As mentioned above, the volume level view includes a plurality of volumes in the selected node, each including a volume ID and QoS sets latency. At decision block 570, a determination is made as to whether a user at client 110 has selected a volume for further examination. If not, control is returned to processing block 560, where the volume view continues to be displayed at client 110. Otherwise, an in-depth view of the selected volume is generated for display at client 110, processing block 580. As discussed above, the in-depth view includes a table showing various QoS parameters.

Figure 6:
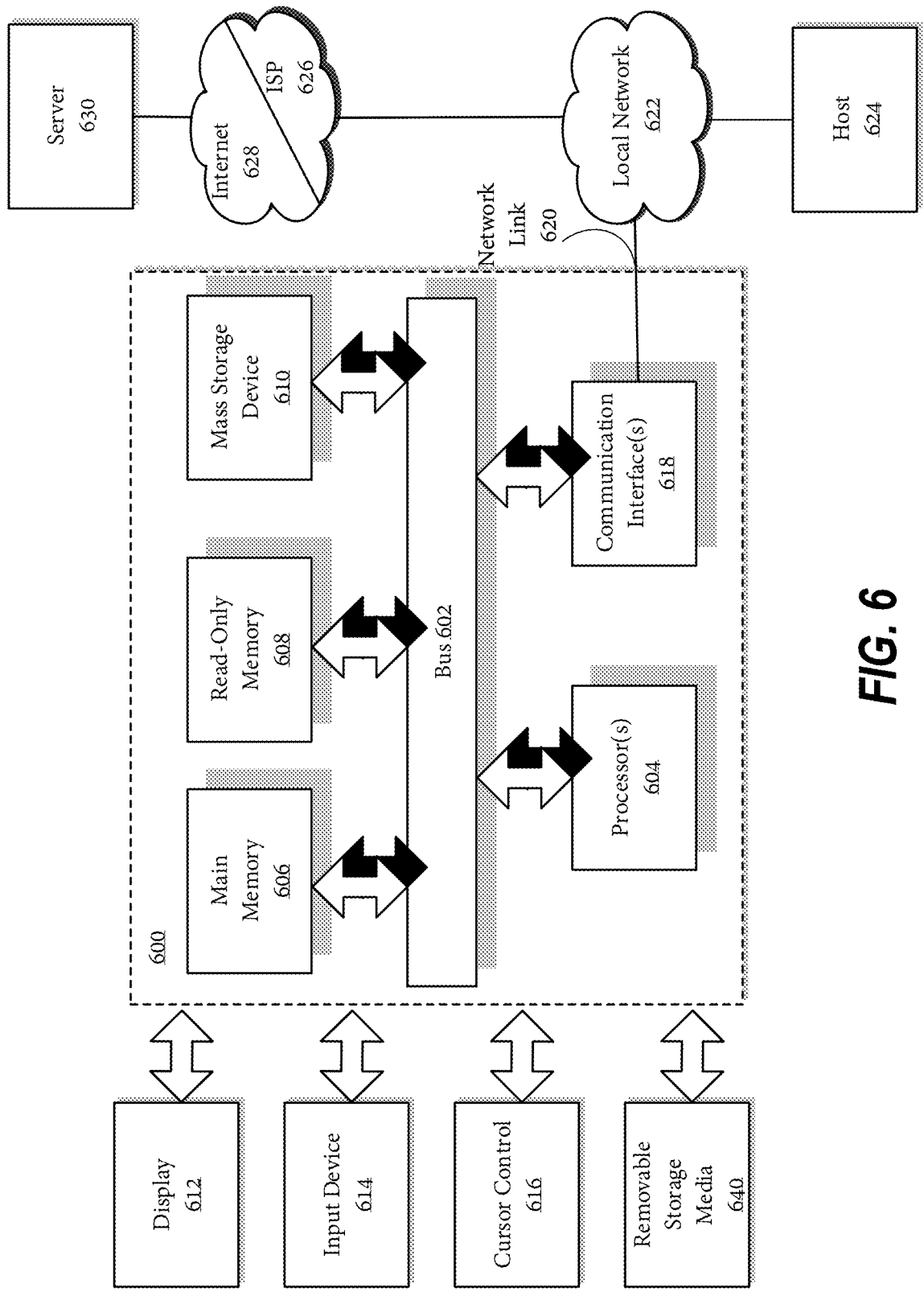
FIG. 6 illustrates an example computer system in which or with which embodiments of the present disclosure may be utilized.

FIG. 6 is a block diagram that illustrates a computer system 600 in which or with which an embodiment of the present disclosure may be implemented. Computer system 600 may be representative of all or a portion of the computing resources associated with a storage node (e.g., storage node 136), a collector (e.g., collector 138), a monitoring system (e.g., monitoring system 122) or an administrative workstation (e.g., client computer system 110). Notably, components of computer system 600 described herein are meant only to exemplify various possibilities. In no way should example computer system 600 limit the scope of the present disclosure. In the context of the present example, computer system 600 includes a bus 602 or other communication mechanism for communicating information, and a processing resource (e.g., a hardware processor 604) coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, e.g., a magnetic disk, optical disk or flash disk (made of flash memory chips), is provided and coupled to bus 602 for storing information and instructions.

Computer system 600 may be coupled via bus 602 to a display 612, e.g., a cathode ray tube (CRT), Liquid Crystal Display (LCD), Organic Light-Emitting Diode Display (OLED), Digital Light Processing Display (DLP) or the like, for displaying information to a computer user. An input device 614, including alphanumeric and other keys, is coupled to bus 602 for communicating information and command selections to processor 604. Another type of user input device is cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Removable storage media 640 can be any kind of external storage media, including, but not limited to, hard-drives, floppy drives, IOMEGA® Zip Drives, Compact Disc
    Read Only Memory (CD-ROM), Compact Disc-Re-Writable (CD-RW), Digital Video Disk
    Read Only Memory (DVD-ROM), USB flash drives and the like.

Computer system 600 may implement the techniques described herein using customized hard-wired logic, one or more ASICs or FPGAs, firmware or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 610. Volatile media includes dynamic memory, such as main memory 606. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 522 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, or stored in storage device 610, or other non-volatile storage for later execution.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method performed by one or more processing resources of one or more computer systems, the method comprising:
   collecting quality of service (QoS) data of a distributed storage system associated with a client device, wherein the data comprises telemetry data, statistics and performance health scores for nodes associated with the client device;
   generating a plurality of QoS diagnostic views to facilitate display of visual representations of the collected QoS data, including:
      generating a first view including a plurality of clusters associated with the client device;
      receiving a selection of a first of the plurality of clusters; and
      generating a second view including a plurality of nodes included in the first cluster wherein each of the plurality of nodes included in the second view comprises a load indication representing a maximum value between a primary cache and a secondary cache capacity utilization; and
   transmitting the visual representations for display at the client device.

2. The method of claim 1, wherein each of the plurality of clusters comprises a cluster name, cluster identifier (ID) and a QoS health status associated with the cluster.

3. The method of claim 2, wherein the QoS health status associated with the cluster comprises one of healthy cluster performance, cluster performance warning and performance issues detected.

4. The method of claim 3, wherein each of the plurality of clusters further comprises a visual indication of the QoS health status.

5. The method of claim 1, wherein each of the plurality of nodes further comprises a node ID and QoS health status associated with the node.

6. The method of claim 5, wherein the QoS health status associated with the cluster comprises one of node healthy or node warning.

7. The method of claim 6, wherein each of the plurality of nodes further comprises a visual indication of the QoS health status.

8. The method of claim 1, further comprising:
   receiving a selection of a first of the plurality of nodes; and
   generating a third view including a plurality of volumes included in the first node.

9. The method of claim 8, wherein each of the plurality of volumes comprises a volume ID and QoS sets latency.

10. The method of claim 9, wherein each of the plurality of nodes further comprises a visual indication of the QoS sets latency.

11. The method of claim 8, further comprising:
   receiving a selection of a first of the plurality of volumes; and
   generating a fourth view including QoS parameters associated with the first volume.

12. A non-transitory computer-readable storage medium embodying a set of instructions, which when executed by a processing resource cause the processing resource to:
   collect quality of service (QoS) data of a distributed storage system associated with a client device, wherein the data comprises telemetry data, statistics and performance health scores for nodes associated with the client device;
   generate a plurality of QoS diagnostic views to facilitate display of visual representations of the collected QoS data, including:
      generating a first view including a plurality of clusters associated with the client device;
      receiving a selection of a first of the plurality of clusters; and
      generating a second view including a plurality of nodes included in the first cluster wherein each of the plurality of nodes included in the second view comprises a load indication representing a maximum value between a primary cache and a secondary cache capacity utilization; and transmit the visual representations for display at the client device.

13. The computer-readable storage medium of claim 12, wherein each of the plurality of clusters comprises a cluster name, cluster identifier (ID) and a QoS health status associated with the cluster.

14. The computer-readable storage medium of claim 12, embodying the set of instructions, which when executed by the processing resource further cause the processing resource to: receive a selection of a first of the plurality of nodes; and generate a third view including a plurality of volumes included in the first node.

15. The computer-readable storage medium of claim 14, embodying a set of instructions, which when executed by a processing resource further cause the processing resource to:
receive a selection of a first of the plurality of volumes; and
generate a fourth view including QoS parameters associated with the first volume.

16. A system comprising:
a processing resource; and
a non-transitory computer-readable medium, coupled to the processing resource, having stored therein instructions that when executed by the processing resource cause the processing resource to:
collect quality of service (QoS) data of a distributed storage system associated with a client device, wherein the data comprises telemetry data, statistics and performance health scores for nodes associated with the client device;
generate a plurality of QoS diagnostic views to facilitate display of visual representations of the collected QoS data, including:
generating a first view including a plurality of clusters associated with the client device;
receiving a selection of a first of the plurality of clusters; and
generating a second view including a plurality of nodes included in the first cluster wherein each of the plurality of nodes included in the second view comprises a load indication representing a maximum value between a primary cache and a secondary cache capacity utilization; and
transmit the visual representations for display at the client device.

17. The system of claim 16, wherein each of the plurality of clusters comprises a cluster name, cluster identifier (ID) and a QoS health status associated with the cluster.

18. The system of claim 16, further comprising:
receiving a selection of a first of the plurality of nodes; and
generating a third view including a plurality of volumes included in the first node.

19. The system of claim 18, wherein each of the plurality of volumes comprises a volume ID and QoS sets latency.

20. The method of claim 18, further comprising:
receiving a selection of a first of the plurality of volumes; and
generating a fourth view including QoS parameters associated with the first volume.

* * * * *